Oct. 25, 1938.  J. W. HARVEY  2,134,401
FISH LURE
Filed Aug. 9, 1937
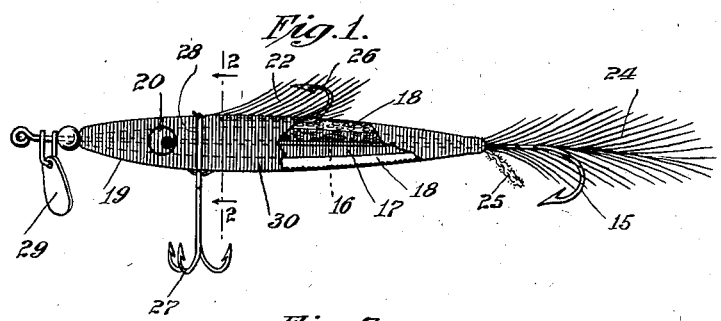
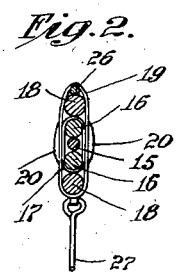
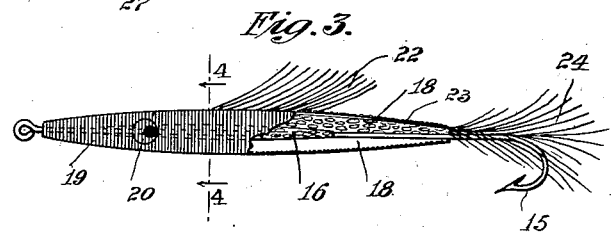
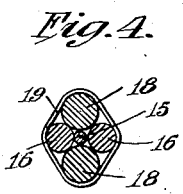
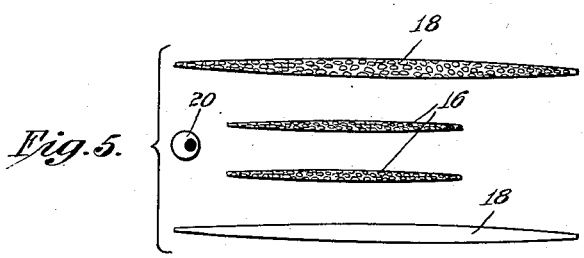
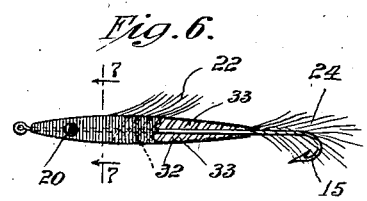
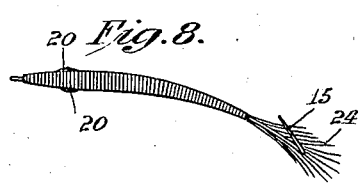
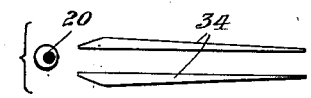
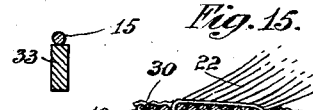
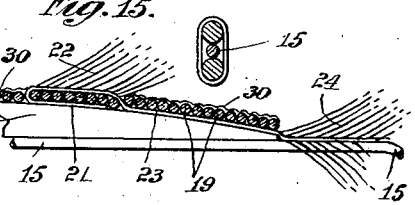
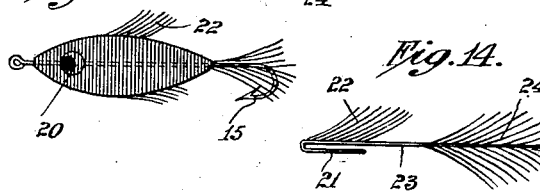
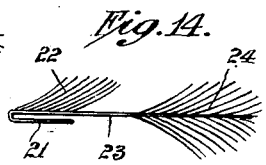
INVENTOR
James W. Harvey
BY
ATTORNEY Patented Oct. 25, 1938

2,134,401

UNITED STATES PATENT OFFICE 2,134,401

FISH LURE

James W. Harvey, Lakeville, Conn.

Application August 9, 1937, Serial No. 158,021

19 Claims. (Cl. 43—48)

This invention relates to fish lure or artificial bait.

The main object is to provide a device that is highly alluring in appearance and action.

Another object is to provide a type of construction that can be made by hand in various designs.

Still another object is to provide a fish lure which is inexpensive.

A further object is to provide such a lure that has a body similar in shape and appearance to that of a small fish.

An object of this invention is to provide a fish lure that can be cast either with a fly rod or a plug casting rod.

Another object is to provide a lure suitable for use in trolling.

Another object is a fish lure that simulates the erratic action of a wounded fish when drawn through the water.

A further object is to provide a fish lure that is tough and durable.

In the preferred form, the lure of my invention is made up of a number of tapered splints, sticks or small strips of wood which are assembled on or along the shank of a conventional barbed hook and wound closely from end to end with a transparent filament such as coated silk or synthetic gut. The splints are colored, printed or ornamented suitably. The eyes are preferably formed by applying discs of colored paper or other material to the sides of the body and covering them with the winding filament. One or more feathers are also secured in place by means of the winding so as to at least partially conceal the hook barb and simulate the action of a small fish's fins. The hook and attached splints are bent in order that the lure when drawn through the water may simulate the swimming action of a small fish.

A coating of transparent enamel or varnish serves not only to protect the body, but to so reflect the light from the striated body as to produce a shimmering of light which attracts the fish to be caught. This thread or filament may itself be tinted or colored but should be made preferably, of a substance which when varnished or enameled is transparent.

Fig. 1 is a side view of a lure involving my invention in the form of a minnow, parts being broken away to show the interior construction.

Fig. 2 is a cross section on the plane of line 2—2 of Fig. 1 but on a somewhat larger scale.

Fig. 3 is a view similar to Fig. 1, but of a somewhat different construction resembling a small pickerel.

Fig. 4 is a cross section of the device of Fig. 3 taken on the plane of line 4—4 but enlarged.

Fig. 5 is an exploded view of the body and eye members of Fig. 3.

Fig. 6 is a side view and partial section of another modification showing a small minnow.

Fig. 7 is a sectional view on the plane of the line 7—7 of Fig. 6 but enlarged.

Fig. 8 is a plan view of the form shown in Fig. 6.

Fig. 9 is a side view of the body and eye members of Figs. 6, 7 and 8.

Fig. 10 is a side view of still another form of my device—a very small minnow or the like.

Fig. 11 is a sectional view of the form of Fig. 10 but enlarged.

Fig. 12 is a cross section of another modification.

Fig. 13 is a side view of another form resembling a small sunfish or "pumpkin seed".

Fig. 14 shows a feather trimmed for use in my invention.

Fig. 15 is an enlarged fragmentary section showing how the feather is fastened.

The hook 15 may be of any suitable form and size. In the form shown in Figs. 1 and 2, the splints 16, 16 are tied tightly to the shank of the hook by a transparent or translucent thread or filament 17 which is wound closely about them. The outer splints 18, 18 are then applied and an outer covering of transparent thread or filament 19 is wound closely in place from end to end of the splints and tied at the ends in any suitable manner. The eyes are formed from one or more discs 20 of colored paper applied to the sides of the splints and held by the filament coating. This causes the coating to bulge outwardly so as to produce the effect of shiny, bulging eyes. A feather is also applied and secured in place by the filament winding. The end 21 of the stem (Fig. 14) is bent under and held by the filament. The barbs 22 are left outside to simulate the back fin. The part 23 of the stem is covered with the winding filament and the tip 24 is left exposed to partially cover the barb of the hook and simulate the tail of a fish.

The splints may be of whitewood or reed rattan and are preferably shellacked and then printed, colored or ornamented as desired. The shellac protects the wood and prevents the ink or paint from spreading and blurring. By application of suitable designs, the lure may be made to simulate any desired fish.

Additional attraction for instance a strip of red wool 25 may be wound in near the barb of the hook. Additional barbs may also be held in place by the winding filament or thread, i. e., hook 26 which is partially concealed by the back fin feather 22 and a hook 27 which is held by a loop 28 of wire suitably secured to the body beneath the winding filament. A spinner 29 may also be provided if desired. After the winding is completed a coating 30 of transparent enamel or varnish is applied which closes any space which may have been left and furnishes when dry a hard and durable "skin" which reflects the light from the—in effect—striated surface of the lure, the striations being produced by the fine cylindrical surface of the winding filament or thread.

The shank of the hook and the splints are preferably bent laterally after the winding is applied and before the enamel or varnish has "set". After the coating has set, the body retains its warped or bent form indefinitely. The ornamentation and color are not only visible through the coating or filament winding and through the enamel or varnish, but they are protected by the filament and the enamel skin so that they are not scraped off and seldom fade.

The form shown in Figs. 3 and 4 more closely resembles a small pickerel or pike. In this case, the four splints 16, 16, 18, 18, are grouped about the shank of the hook, the splints 16, 16 being smaller so as to produce the effect of a tapered body.

In some cases, it may be desirable to form one or more of the members such as 16, 16 of lead or other metal so as to add weight and enable the lure to be cast and used like a plug.

In the form shown in Fig. 6, a strip of tinsel 32 is wound about the body before the transparent thread or filament is applied. The outer thread coating and varnish or enamel thus protect the tinsel from tarnishing and provide a much smoother outer surface which is not likely to be damaged.

Ordinarily, I prefer to use tapered splints of circular cross section, as they are easier to handle and print and produce a better appearance, but I may use splints 33 of rectangular section as shown in Fig. 7.

The splints 34 may be tapered as shown in Fig. 9, so as to produce the desired shape in the finished product.

Special designs, for instance of spots 35 may be employed, as shown in Fig. 10. So also, I may print special designs 36 on the feathers and thus use ordinary cheap feathers instead of the more expensive natural feathers.

The part of the feather which forms the back fin is anchored to the body by the enamel or varnish as well as by the thread at each end of the fin.

Hairs or bristles may be added to or substituted for the feathers and held in place in the same manner in producing other designs. In some cases, two or more feathers of different colors may be used.

To form such a lure as shown in Figs. 6, 7 and 8, the barbed end of the hook is held in a vise. One end of the thread or filament is tied to the shank of the hook near the eye of the hook. The splints are laid along the shank of the hook and the thread is then wound tightly with adjacent convolutions snugly against each other. At the appropriate points, the "eye" discs are laid against the body and the thread wound over them. The stem end 21 of the feather is then laid along the body with the tail end extending over the eye end so that the thread winding may continue up to the point where the part 23 of the feather is to be covered with the winding. The tail end of the feather is then bent over into place and the winding continued to the end of the body where the thread is tied off. The body and shank of the hook are then bent laterally near the tail end and the enamel or varnish applied so as to seal all the possible spaces between the convolutions of thread and form a lustrous, transparent, waterproof hard and tough skin. This method of manufacture may be modified in the production of some designs.

As the wooden splints are preferably somewhat larger in cross section than the shanks of the hooks, there will always be spaces along the shanks and between the splints which form air cells so that the specific gravity of the finished product is only slightly more than 1. As a consequence, the lure will sink only slowly as it is moved in the water.

It will be seen that this type of lure may be made by hand and in various designs and at low cost. It has been found highly successful as a lure especially in casting and trolling.

The form shown in Fig. 13 has a wide lateral surface which reflects light in a remarkable manner.

I claim:
1. A fish lure having a wooden splint lying along the underside of the shank of the hook, the shank and splint being bent laterally, a feather having its stem attached to the upper side of the shank and extending beyond the barb of the hook, a covering of filament wound closely together along the shank, the splint and the stem of the feather, the covering being coated with a hard enamel forming a shiny waterproof coating, the combination having a specific gravity slightly more than 1, but being floatable when dry.

2. A fish lure comprising a hook with a number of tapered wooden splints lying along the shank of the hook with air spaces between the splints, a covering consisting of a filament wound tightly around the splints and tied at the ends and a coating of enamel on the filament and having a hard and lustrous outer surface.

3. A fish lure comprising a hook with a shank portion, wooden splints positioned along the shank and spaced radially therearound, and thread wound helically around the splints from end to end to form a cover and to form air pockets between the splints, and a transparent coating on the cover.

4. A fish lure comprising a hook with a shank portion, wooden splints positioned along the shank and spaced radially therearound, and thread wound helically around the splints from end to end to form a cover, the outer edges of said splints being shaped to conform to the shape of the body of a fish, and a lustrous transparent coating on the cover.

5. A fish lure comprising a hook with a shank portion, wooden splints positioned along the shank and spaced radially therearound and fine thread wound around the splints forming a cover, the outer edges of the splints being shaped to conform to the shape of the body of a fish, said shank, splints and cover being bent laterally and coated with a hard transparent enamel holding the body in shape.

6. A fish lure comprising a hook with a shank portion, wooden splints positioned along the shank and spaced radially therearound, a filament thread wound helically around the splints to form a cover, the outer edges of the splints being shaped to conform to the shape of the body of a fish, and a feather having its stem fastened to the shank and its barbs extending outwardly of the barb of the hook.

7. A fish lure comprising a hook with a shank portion, wooden splints positioned along the shank and spaced radially therearound, a transparent thread wound around the splints to form a cover, the outer edges of the splints being shaped to conform to the shape of the body of a fish, a bright flexible metal strip coiled around the splints inside of the thread cover, and a hard transparent waterproof coating on the cover.

8. A fish lure comprising a hook with a shank portion, splints positioned along the shank and spaced radially therearound, thread wound around the splints to form a cover and to form air pockets between the splints, the outer edges of the splints being shaped to conform to the shape of the body of a fish, and a feather having its stem fastened to the shank and its barbs extending outwardly of the hook and forming an elongation of the shank.

9. A fish lure consisting of a hook having a body portion shaped to simulate a fish, a casing formed of a filament wound closely from end to end of the body, and a feather member having a portion extending from the back like a fin, and a tail portion partially concealing the barbed end of the hook, the front end of the stem of the feather member being bent under and held in place by the filament winding and another portion of the stem between the fin and the tail portion being also held in place by the filament winding.

10. A fish lure consisting of a hook having a body portion, a transparent casing surrounding the body portion and the shank of the hook and formed of a filament wound from end to end of the body, eye members formed of discs inserted between the casing and the body and causing the casing to bulge thereat and an outer coating of transparent varnish on the casing.

11. A fish lure consisting of a hook having a barb and a shank, wooden splints laid along the shank on opposite sides thereof to form a relatively flat body, eye discs disposed on opposite sides of the body, a transparent cover thread wound closely around the splints, the discs and the shank, and tied thereto at its ends, a tail piece secured to the body and projecting beyond the barbed end of the hook and a lustrous, transparent, tough, coating on the cover.

12. A fish lure comprising a hook, shellacked and ornamental tapering splints laid along the shank of the hook, a transparent filament wound tightly around the splints and the shank of the hook from end to end of the splints to hold the parts in place and form a striated casing, and a tough, hard, lustrous, waterproof coating over the filament.

13. A fish lure comprising a hook having a shank, four splints laid along the length of the shank to simulate the shape of a fish, a transparent filament wound closely along the splints from end to end to hold them in place, and a lustrous, transparent coating over the filament.

14. A fish lure comprising a hook having a shank, splints arranged on opposite sides of the shank, a thread wound around the splints to hold them against the shank, additional splints arranged along the first mentioned splints and in substantially the same plane therewith to form a relatively flat body and an outer casing of transparent filament holding the parts together.

15. The method of making a fish lure which comprises applying a number of splints along the shank of a hook, winding a thread closely around the splints from end to end and inserting beneath the thread while winding, eye discs and feather sections, portions of the feather not covered by the thread constituting a back fin and tail portions and then coating the thread with varnish which when set is lustrous, hard, flexible and transparent.

16. The method of making a fish lure which comprises applying a number of splints along the shank of a hook, winding a thread closely around the splints beginning at one end and inserting beneath the thread while winding, the stem of a feather, bending the stem over the winding, so that a portion of the feather not covered by the thread constitutes a back fin and continuing the winding on the splints and the feather to the opposite end of the splints and leaving a tail portion extending beyond the splints and the shank of the hook and then coating the thread with varnish which when set is lustrous, hard, and transparent.

17. A fish lure comprising a hook, tapered splints arranged along the opposite sides of the shank of the hook, a thread wound tightly around the shank and the tapered splints from end to end thereof, and a feather having one end of its stem stripped of barbs and secured to the side of the splints by the thread winding and having the barbs stripped from one side of the stem throughout an adjacent portion and the barbs on the other side of the latter part of the stem projecting to form a back fin, another portion of the stem between the back fin and the tail being bound to the adjacent splints by the winding.

18. A fish hook lure having a head portion attached to the shank of the hook, said head portion having eye-simulating discs secured to the shank by thread wound around the shank and around parts of the discs and covered with a waterproof transparent coating.

19. A fish lure comprising a hook having a shank, a tapered body member extending along the shank, said body and shank together having the general form of a fish, a flexible fin-like member extending from the back of the lure, and a layer of filament wound tightly about the shank and body from end to end of the body and holding the fin-like member in place, said filament being sufficiently transparent so that the body is visible through the filament layer.

JAMES W. HARVEY.